US009020282B2

(12) United States Patent
Guo et al.

(10) Patent No.: US 9,020,282 B2
(45) Date of Patent: Apr. 28, 2015

(54) CODER BASED PARTIAL IMAGE STORAGE AND RETRIEVAL

(71) Applicant: Intel Corporation, Santa Clara, CA (US)

(72) Inventors: Yejun Guo, Shanghai (CN); Feng Chen, Shanghai (CN); Yaqin Xiang, Shanghai (CN); Yinkui Zhang, Shanghai (CN); Zhanwei Du, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 13/729,120

(22) Filed: Dec. 28, 2012

(65) Prior Publication Data
US 2014/0185947 A1  Jul. 3, 2014

(51) Int. Cl.
*G06K 9/00* (2006.01)
*H04N 19/114* (2014.01)
*H04N 19/513* (2014.01)
*H04N 19/573* (2014.01)

(52) U.S. Cl.
CPC ........... *H04N 19/114* (2013.01); *H04N 19/513* (2013.01); *H04N 19/573* (2013.01)

(58) Field of Classification Search
None
See application file for complete search history.

(56) References Cited

U.S. PATENT DOCUMENTS

2006/0088284 A1* 4/2006 Shen et al. ............... 386/52
2007/0110323 A1* 5/2007 Yang ....................... 382/232
2012/0170651 A1* 7/2012 Shimizu et al. ......... 375/240.12

* cited by examiner

*Primary Examiner* — Hadi Akhavannik
(74) *Attorney, Agent, or Firm* — Lynch Law Patent Group, P.C.

(57) ABSTRACT

Systems, apparatus, articles, and methods are described including operations for coder based partial image storage and retrieval.

17 Claims, 9 Drawing Sheets

CODER BASED PARTIAL IMAGE STORAGE AND RETRIEVAL

BACKGROUND

Images weighted a big percentage of storage capacity in Location-Based Services (LBS) cloud service, like Facebook, Google map, Foursquare and so on. In some cases, there may be similarity among images uploaded to a cloud, like photos taken in same place by different people, similar landscapes, similar objects, etc. However, such similar photos are stored separately in the cloud. Accordingly, a lot of data blocks may be duplicated.

Similarly, today's digital cameras save each photo in a separate image file. When multiple similar photos are taken, significant data are duplicated in image files. For example, a user may take three photos for one person with same background. For each file compressed and stored separately, the file will contain all the data for the whole picture. This may result in a redundancy among the similar image files.

Further, many cameras support continuous shooting a series of photos. For such cases, many of the saved image files may be duplicated. Duplicated data is not only a waste of storage, but also costs more bandwidth and time when transferring such files from camera to other devices.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
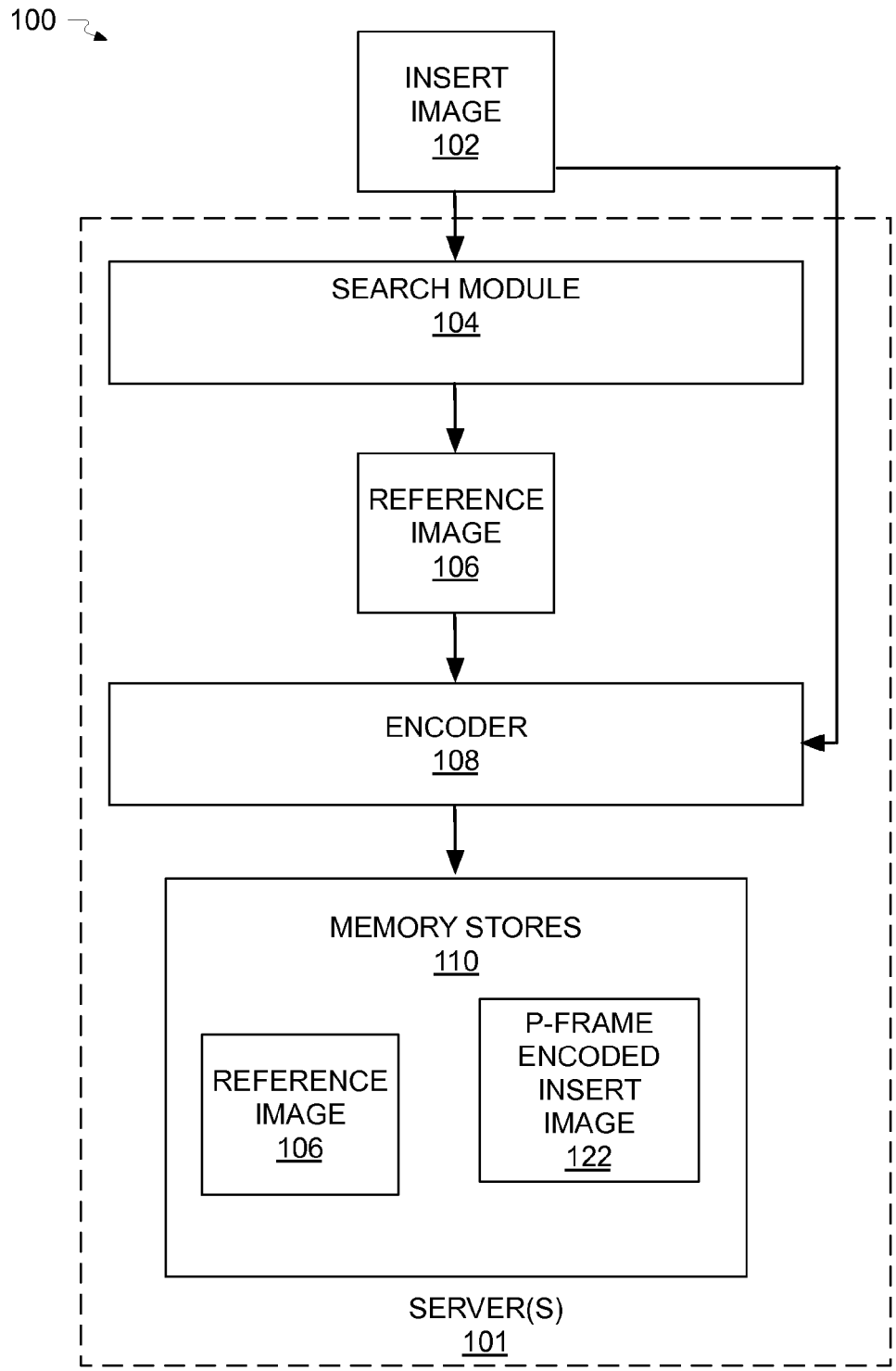
FIG. 1 is an illustrative diagram of an example image storage system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", "embodiment", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, aspect, element, or characteristic is described in connection with an implementation or embodiment, it is submitted that it is within the knowledge of one skilled in the art to effect such feature, structure, aspect, element, or characteristic in connection with other implementations or embodiments whether or not explicitly described herein. Any feature, structure, aspect, element, or characteristic from an embodiment can be combined with any feature, structure, aspect, element, or characteristic of any other embodiment.

Systems, apparatus, articles, and methods are described below including operations for coder based partial image storage and retrieval.

As will be described in greater detail below, operations for coder based partial image storage and retrieval may be implemented to keep one copy for common portion of images and store delta information for separated image differences. For example, media encoder and decoder technique may be repurposed so as to optimize image store. For an uploaded photo, a search may be done to retrieve one photo similar to that uploaded photo, where the similar photo may have been previously stored in the system. If such a similar photo is found, the similar photo may be used as reference photo. The difference between new uploaded photo and the reference photo may be calculated by facilitating the hardware encoder of media pipeline. Data regarding the uploaded photo may be stored in a database as a record including a bit stream to hold delta data as compared to the reference photo as well as an index of the reference photo itself.

FIG. 1 is an illustrative diagram of an example image storage system 100, arranged in accordance with at least some implementations of the present disclosure. In various implementations, image storage system 100 may be configured to undertake image storage. Further, in various embodiments, image storage system 100 may be implemented as part of one or more servers 101, such as might be configured to support a cloud network, for example. Additional components not illustrated here may be included in image storage system 100.

In the illustrated example, image storage system 100 may be configured for processing an insert image 102 and may include a search module 104, one or more encoders 108, and/or one or more memory stores 110. Encoders 108 may be communicatively coupled to servers 101. Memory stores may be communicatively coupled to encoders 108. Search module 104 may be implemented by servers 101. Search module 104 may be configured to, in conjunction with encoders 108 and memory stores 110, receive insert image 102 and search stored reference images 106 for a close match with insert image 102. Search module 104 may further be configured to treat insert image 102 as a P-frame during encoding if a close match with at least one reference image 106; and store the P-frame encoded insert image 122 along with associated linking relationship data. Such linking relationship data may be configured to associate a dependent relationship associating with the P-frame encoded insert image 122 to the reference image 106. In some examples, search module 104 may be implemented as a software program resident on any of server 101.

As will be described in greater detail below, in other implementations, image storage system 100 may instead represent an apparatus for coder based partial image storage and retrieval on a computing device. Such a computing device based image storage system 100 may include search module 104, one or more encoders 108, and/or one or more memory stores 110 being implemented on a computer. As used herein, the term "computing device" may include various devices, including, but not limited to mobile computing devices, which may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. In such examples, such a computer based image storage system 100 may include an image capturing component (not shown) configured to capture still images and/or video images (such as a camera, for example).

Image storage system 100 may include processor(s), multicore processors, application specific integrated circuits, programmable logic devices, graphics cards, integrated graphics, general purpose graphics processing unit(s), or the like. In addition, memory stores 110 may be any type of memory such as volatile memory (e.g., Static Random Access Memory (SRAM), Dynamic Random Access Memory (DRAM), etc.) or non-volatile memory (e.g., flash memory, etc.), disk-type memory, a storage network, and so forth. In a non-limiting example, memory stores 110 may be implemented by cache memory. A system agent/memory controller may include any suitable implementation configured to manage system 100 and to control memory stores 110.

In various embodiments, search module 104 may be implemented in software, while hardware may implement other logic modules. For example, in some embodiments, search module 104 may be implemented by software instructions executed by logic processors while other logic modules (e.g., encoders 108) may be provided by application-specific integrated circuit (ASIC) logic. However, the present disclosure is not limited in this regard and search module 104 may be implemented by any combination of hardware, firmware and/or software.

As will be discussed in greater detail below, image storage system 100, as described in FIG. 1 may be used to perform some or all of the various functions discussed below in connection with FIGS. 3-7.

Figure 2:
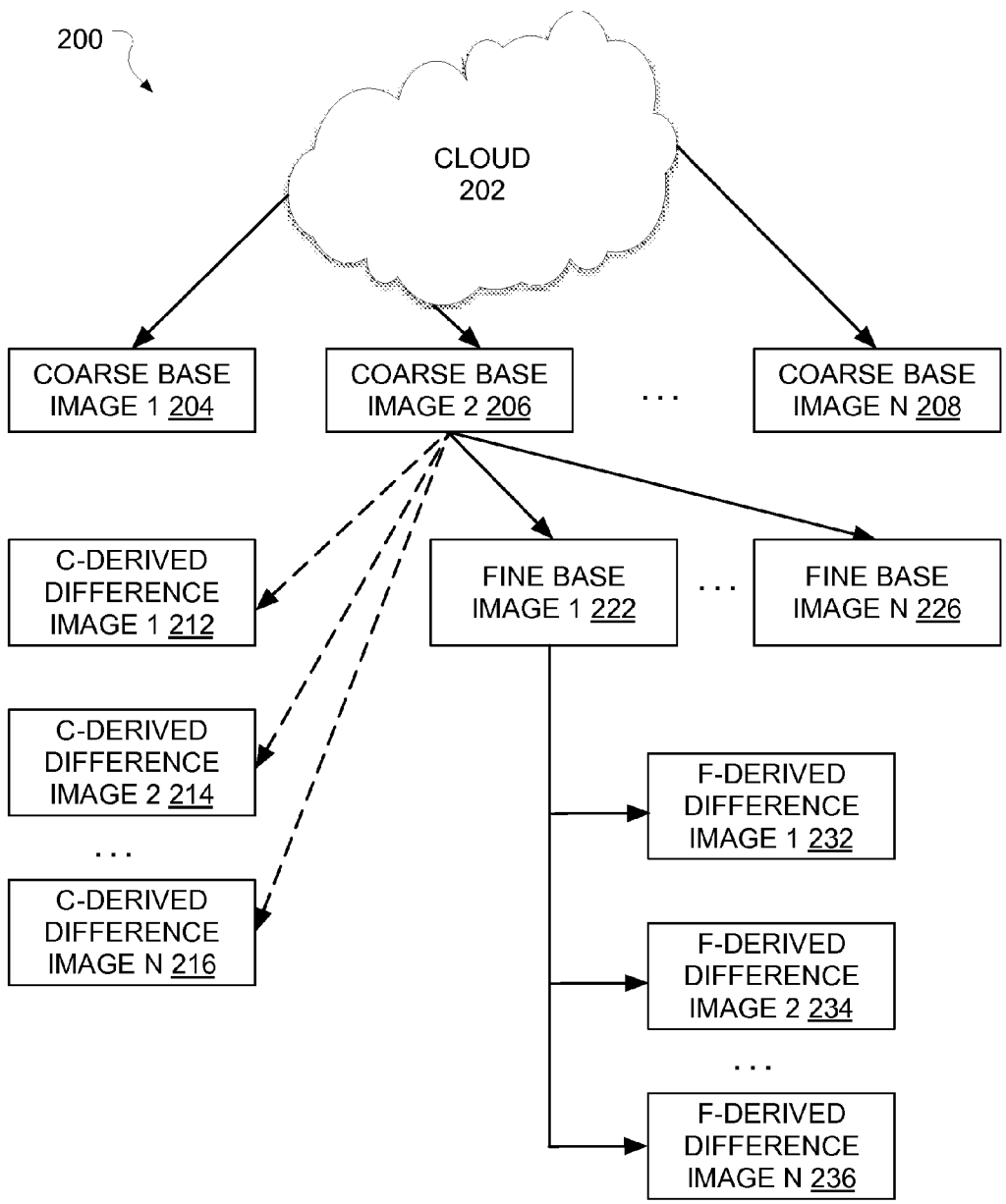
FIG. 2 is another illustrative diagram of an example image storage system.

FIG. 2 is an illustrative diagram of an example image storage system 200, arranged in accordance with at least some implementations of the present disclosure. In the illustrated implementation, image storage system 200 may illustrate the design of a cloud 202 photo storage system. Images in image storage system 200 may be stored in clusters. In each cluster, images may be organized in a tree of photos with four types: 1) coarse base images, 2) C-derived difference images, 3) fine base images, and 4) F-derived difference images.

The root tree node may include a coarse base image (e.g., coarse base image 1 204, coarse base image 2, 206 . . . coarse base image N 208), all of whose information are self-contained in its record. Images that are visually close to a coarse base image may be stored as a list of C-derived difference images (e.g., C-derived difference image 1 212, C-derived difference image 2, 214 . . . C-derived difference image N 216), which may be the left child of the root node. As used herein, the term "C-derived difference image" may refer to an image stored with a difference derived from a coarse base image. Records in that list may only contain delta information of the insert image as compared to the close coarse base image. For insert images that are significantly different from the coarse base image, but still identified as belonging to current cluster, these insert images may be stored as fine base images (e.g., fine base image 1 222 . . . fine base image N 226). The fine base images may be a self-contained record. Other insert images that are identified as belonging to a current cluster may be stored in a F-derived difference images list (e.g., F-derived difference image 1 232, F-derived difference image 2, 234 . . . F-derived difference imageN 236) associated with a corresponding fine base image. As used herein, the term "F-derived difference image" may refer to an image stored with difference derived from a fine base image. Such F-derived difference image records may include interpolation coefficients as compared to the associated fine base image. Conceptually, coarse base image and C-derived difference images may be processed in a manner similar to that used for I-Frames and P-Frames in media coding pipelines. Similarly, fine base images and F-derived difference images may be processed in a manner similar to that used for I-Frames and P-Frames in media coding pipelines.

As will be discussed in greater detail below, image storage system 200, as described in FIG. 2 may be used to perform some or all of the various functions discussed below in connection with FIGS. 3-7.

Figure 3:
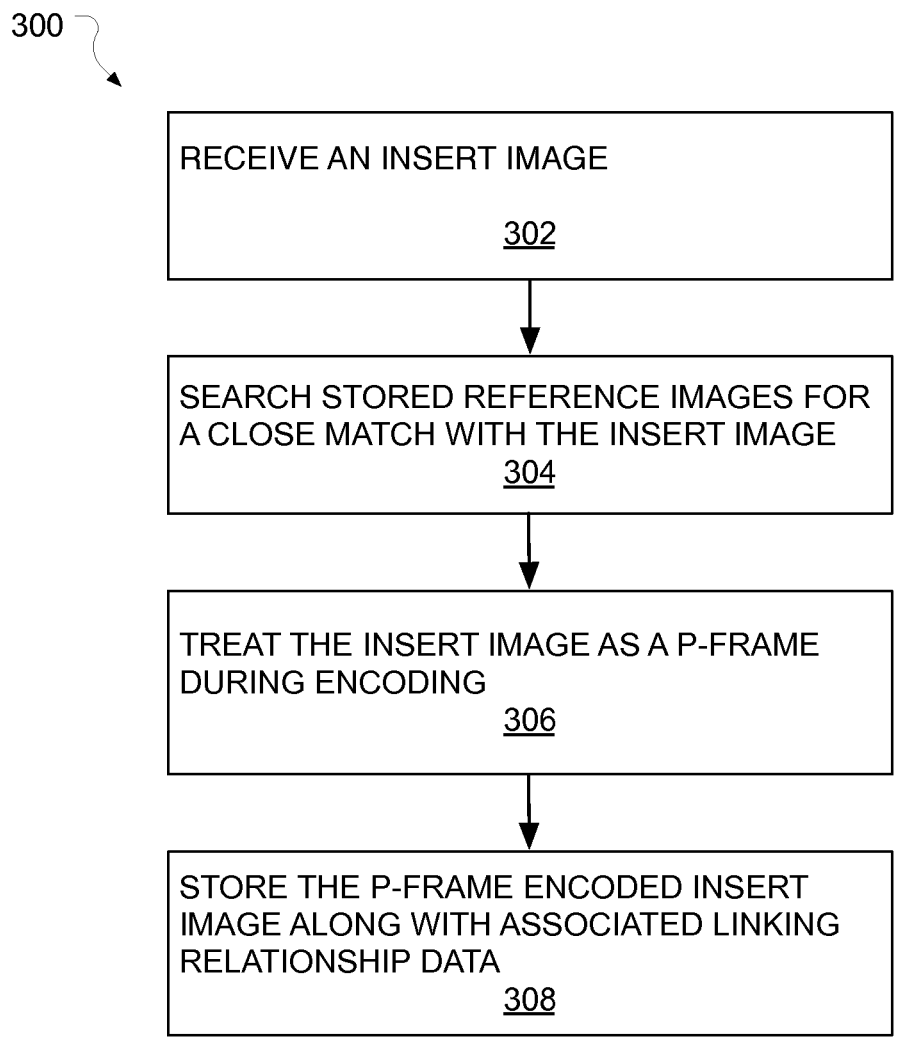
FIG. 3 is a flow chart illustrating an example image storage process.

FIG. 3 is a flow chart illustrating an example image storage process 300, arranged in accordance with at least some implementations of the present disclosure. In the illustrated implementation, process 300 may include one or more operations, functions or actions as illustrated by one or more of the blocks 302, 304, 306, and/or 308. By way of non-limiting example, process 300 will be described herein with reference to example image storage system 100 of FIG. 1.

Process 300 may be utilized as a computer-implemented method for image storage. Process 300 may begin at block 302, "RECEIVE AN INSERT IMAGE", where an insert image may be received. For example, an insert image may be received by a server in a cloud network or may be received by a computing device capturing an image.

Processing may continue from operation 302 to operation 304, "SEARCH STORED REFERENCE IMAGES FOR A CLOSE MATCH WITH THE INSERT IMAGE", where stored reference images may be searched. For example, stored reference images may be searched for a close match with the insert image. In some examples, such a search may include one or more algorithms, such as those commonly used in image identification or tag based classification, for example.

In some implementations, operation 304 may include searching based on non-image metrics and/or a comparison of image related metrics associated with images filtered from such search results.

For such searching based on non-image metrics, example of non-image characteristics might include "the image submission date and time", the "client network address who submitted the image", the "text description if available", the "GPS location data", the data of "acceleration sensor", the like, and/or combinations thereof. A "close match" may be selected based on the similarity of one or a combination of those metrics. In this step, a group of images may be returned.

For such a comparison of image related metrics associated with images filtered from such search results, example of image related metrics might include "the resolution", "the regression curve of histogram of color channel", some advanced technique which can increase the accuracy in some cases, the like, and/or combinations thereof. Some images may be filtered out in this step. Such a comparison of image related metrics step is optional in some implementations. For example, in a camera based implementation, a comparison of image related metrics might be omitted.

Those metrics used in searching based on non-image metrics as well as in comparing image related metrics might be pre-defined and stored as supplementary fields of image file name in the storage system. Implementations could choose a metrics set based on the balance of computation overhead and requirements on accuracy. Some advanced techniques mentioned above could be image retrieval techniques in following products: QBIC (Query By Image Content) from IBM, Virage from Virage, RetrievalWare from Excalibur, Photobook from MIT, VisualSEEK from Columbia University, or the like. When an implementation wants to use such advanced techniques, the implementation may access such advanced techniques through a communicative interface. However, such advance techniques, are optional and are not required for all implementations.

Processing may continue from operation 304 to operation 306, "TREAT THE INSERT IMAGE AS A P-FRAME DURING ENCODING", where the insert image may be treated as a P-frame. For example, the insert image may be treated as a P-frame during encoding if a close match with at least one reference image.

Processing may continue from operation 306 to operation 308, "STORE THE P-FRAME ENCODED INSERT IMAGE ALONG WITH ASSOCIATED LINKING RELATIONSHIP DATA", where the P-frame encoded insert image may be stored along with associated linking relationship data. For example, the P-frame encoded insert image may be stored along with associated linking relationship data, where the linking relationship data is configured to associate a dependent relationship associated with the P-frame encoded insert image.

In operation, process 300 may be utilized as a computer-implemented method for the general control flow of inserting/uploading images. Firstly, a reference image may be found with an algorithm, such as those commonly used in image identification or tag based classification, for example. Secondly, each cluster of reference images may be divided into fine grain clusters with the help of a hardware encoder. Finally, the hardware encoder may be utilized to compress the insert images based on the reference cluster or the fine cluster by utilizing the concept of I-frames and P-frames.

Some additional and/or alternative details related to process 300 may be illustrated in one or more examples of implementations discussed in greater detail below with regard to FIG. 4.

Figure 4:
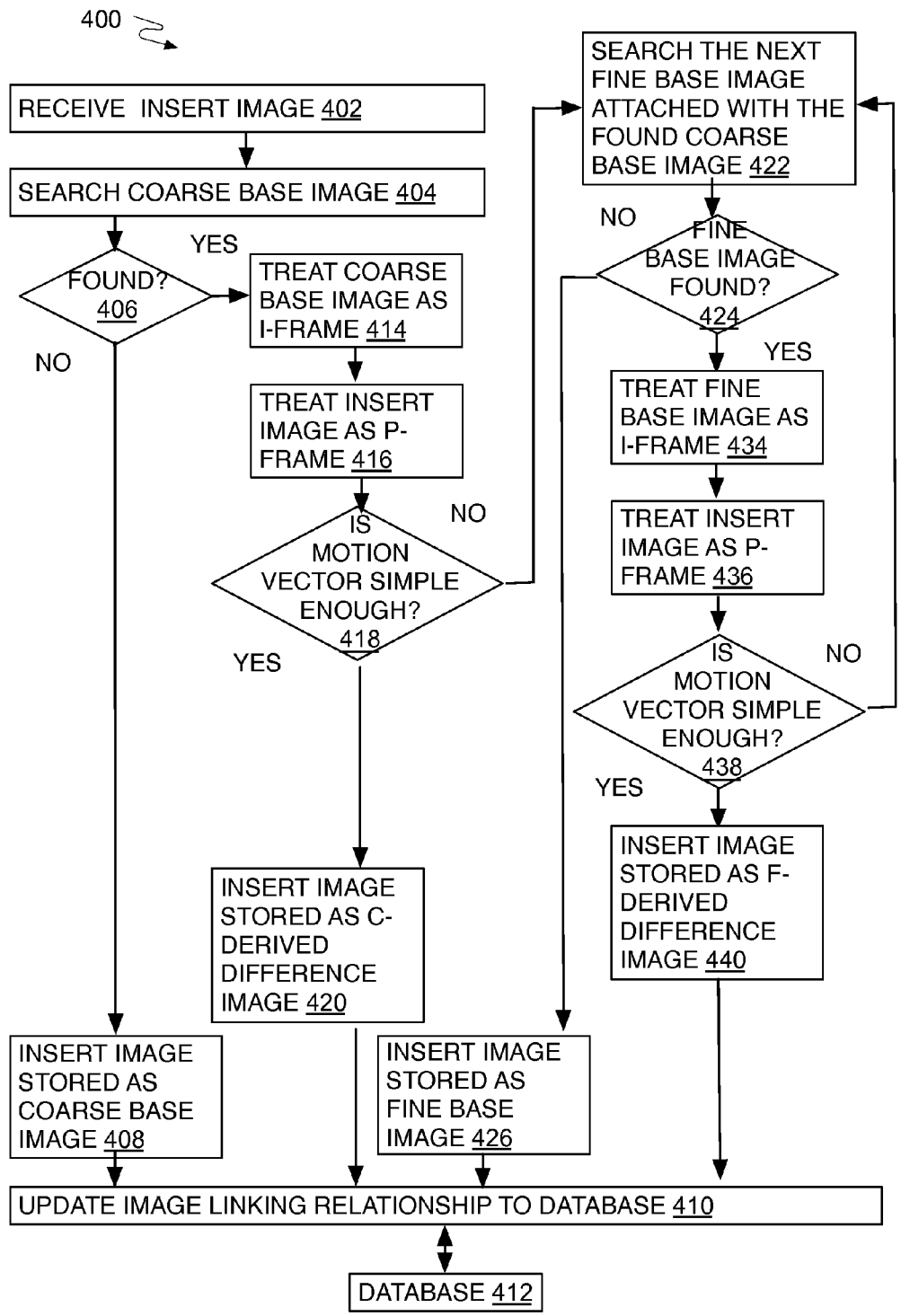
FIG. 4 is a flow chart illustrating an example image storage encoding process for a cloud network.

FIG. 4 is a flow chart illustrating an example image storage encoding process for a cloud network, arranged in accordance with at least some implementations of the present disclosure. In the illustrated implementation, process 400 may include one or more operations, functions or actions as illustrated by one or more of the blocks 402, 404, 406, 408, 410, 412, 414, 416, 418, 420, 422, 424, 434, 436, 438, and/or 440. By way of non-limiting example, process 400 will be described herein with reference to example image storage system 100 of FIG. 1.

Process 400 may be utilized as a computer-implemented method for image storage. Process 400 may begin at block 402, "RECEIVE INSERT IMAGE", where an insert image may be received. For example, an insert image may be received by a server in a cloud network or may be received by a computing device capturing an image.

Processing may continue from operation 402 to operation 404, "SEARCH COARSE BASE IMAGE", where a search of coarse base images may be performed. Processing may continue from operation 404 to operation 406, "FOUND?", where a determination may be made regarding whether a coarse base image has been found. For example, stored reference images may be searched for a close match with the insert image. In some examples, such a search may include one or more algorithms, such as those commonly used in image identification or tag based classification, for example.

Under some circumstances, processing may continue from operation 406 to operation 408, "INSERT IMAGE STORED AS COARSE BASE IMAGE", where a determination may be made regarding whether the insert image should be stored as a coarse base image. For example, in cases where a close match with at least one reference image is not found, the insert image may be treated as a reference image, where the reference images may be stored as a coarse base image.

Processing may continue from operation 408 to operation 410, "UPDATE IMAGE LINKING RELATIONSHIP TO DATABASE", where an image linking relationship of the insert image to database 412 may be updated. For example, in cases where the insert image is stored as a coarse base image, the image content may be entirely stored.

Under some circumstances, processing may continue from operation 406 to operation 414, "TREAT COARSE BASE IMAGE AS I-FRAME", where the coarse base image may be treated as an I-frame during encoding. Processing may continue from operation 414 to operation 416, "TREAT INSERT IMAGE AS P-FRAME", where the insert image may be treated as a P-frame during encoding. Processing may continue from operation 416 to operation 418, "IS MOTION VECTOR SIMPLE ENOUGH?", where a determination may be made regarding whether a motion vector is simple enough.

For example, in cases where a close match with at least one reference image is found, the close match reference image may be treated as an I-frame while the insert image is treated as a P-frame and a determination may be made regarding whether a motion vector between the insert image and the close match reference image meets a threshold value.

Under some circumstances, processing may continue from operation 418 to operation 420, "INSERT IMAGE STORED AS C-DERIVED DIFFERENCE IMAGE", where the insert image may be stored as a C-derived difference image. Further, operation 410 may also be performed here. For example, in cases where the insert image is stored as a C-derived difference image, only necessary dependent relationships that indicate the small differences as compared to the stored coarse image may be stored here. For example, in cases where the motion vector between the insert image and the close match reference image meets the threshold value, the storing of the P-frame encoded insert image along with associated linking relationship data may include storing a C-derived difference image. Such linking relationship data may be configured to associate a dependent relationship associated with the P-frame encoded insert image as compared to the coarse base image.

Under some circumstances, processing may continue from operation 418 to operation 422, "SEARCH THE NEXT FINE BASE IMAGE ATTACHED WITH THE FOUND COARSE BASE IMAGE", where the next fine base image that is attached with the found coarse base image may be searched. For example, in cases where the motion vector between the insert image and the close match reference image does not meet the threshold value, a first stored fine base image-type reference images may be searched for a close match with the insert image.

Processing may continue from operation 422 to operation 424, "FINE BASE IMAGE FOUND?", where a determination may be made regarding whether a fine base image was found. Under some circumstances, processing may continue from operation 424 to operation 426, "INSERT IMAGE STORED AS FINE BASE IMAGE", where the insert image may be stored as a fine base image. Further, operation 410 may also be performed here. For example, in cases where the insert image is stored as a fine base image, the image content may be entirely stored. For example, in cases where a close match with at least one fine base image-type reference image is not found, the insert image may be treated as a fine base image-type reference image if a close match with at least one fine base image-type reference image is not found. In such a case, the fine base image-type reference images may be stored as the fine base image-type.

Under some circumstances, processing may continue from operation 424 to operation 434, "TREAT FINE BASE IMAGE AS I-FRAME", where the fine base image may be treated as an I-frame during encoding. Processing may continue from operation 434 to operation 436, "TREAT INSERT IMAGE ASP-FRAME", where the insert image may be treated as a P-frame during encoding. Processing may continue from operation 436 to operation 438, "IS MOTION VECTOR SIMPLE ENOUGH?", where a determination may be made regarding whether a motion vector between the insert image and the fine base image is simple enough. For example, in cases where a close match with at least one fine base image-type reference image is found, treating the close match fine base image-type reference image may be treated as an I-frame while the insert image is treated as a P-frame and a determination may be made regarding whether a motion vector between the insert image and the close match fine base image-type reference image meets a threshold value.

Under some circumstances, processing may continue from operation 438 to operation 440, "INSERT IMAGE STORED AS F-DERIVED DIFFERENCE IMAGE", where the insert image may be stored as an F-derived difference image. Further, operation 410 may also be performed here. For example, in cases where the insert image is stored as a F-derived difference image, only necessary dependent relationships that indicate the small differences as compared to the stored fine base image may be stored here. For example, in cases where the motion vector between the insert image and the close match fine base image-type reference image meets the threshold value, the storing of the P-frame encoded insert image along with associated linking relationship data may include storing a F-derived difference image. In such an example, the linking relationship data may be configured to associate a dependent relationship associated with the P-frame encoded insert image as compared to the fine base image-type reference image.

Under some circumstances, processing may continue from operation 438 back to operation 422. For example, in cases where the motion vector between the insert image and the close match fine base image-type reference image does not meet the threshold value, the next stored fine base image-type reference image may be searched for a close match with the insert image.

In operation, process 400 may be utilized as a computer-implemented method for the general control flow of inserting/uploading images. Firstly, a coarse base image may be found with an algorithm, such as those commonly used in image identification or tag based classification, for example. Such a procedure may look like a coarse dividing to the whole cloud system with experts' priori knowledge. Secondly, each coarse cluster may be divided into fine grain clusters with the help of a hardware encoder. Finally, the hardware encoder may be utilized to compress the inserting images based on the coarse cluster or the fine cluster by referring the concept of I-frames and P-frames.

Figure 5:
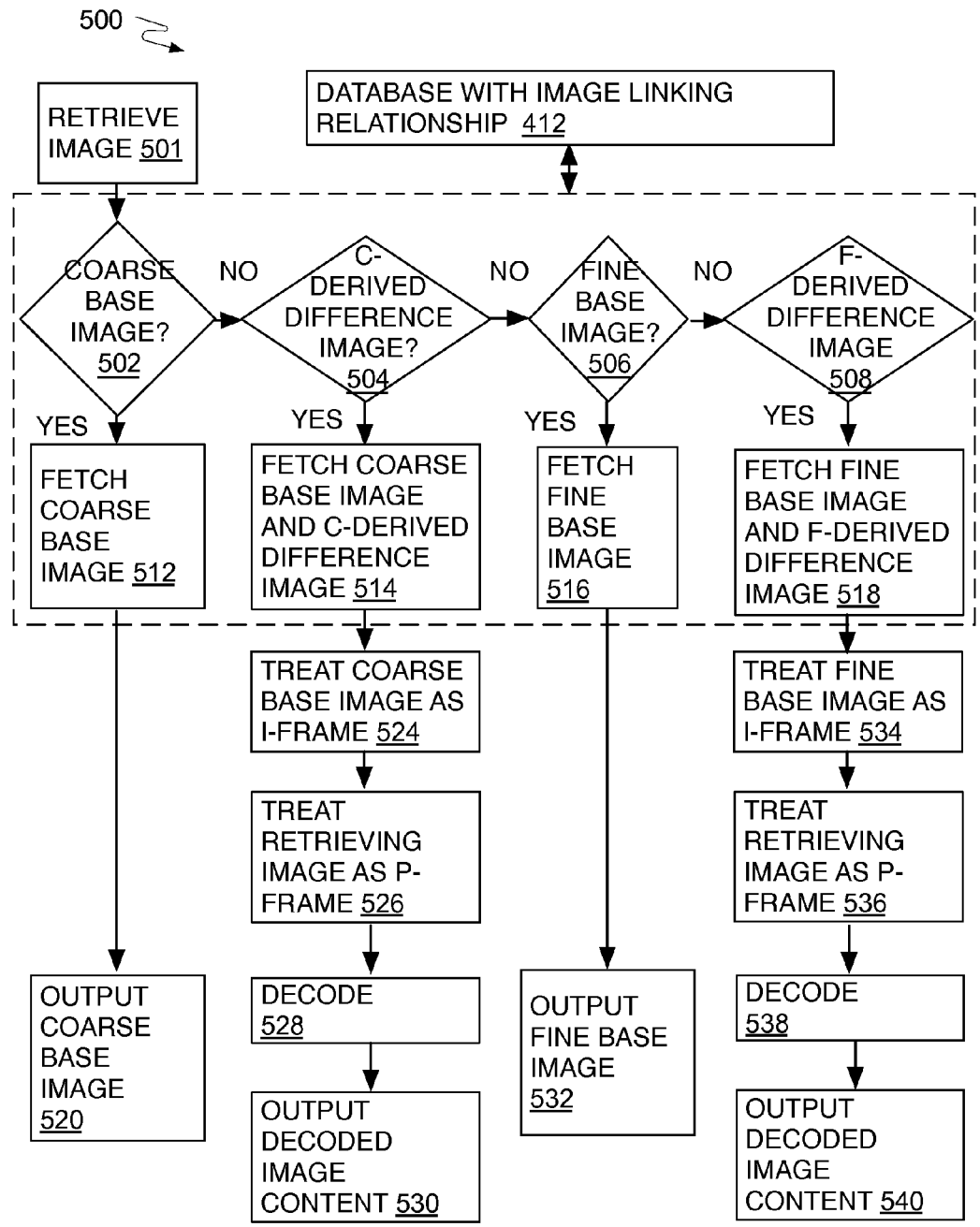
FIG. 5 is a flow chart illustrating an example image storage decoding process for a cloud network.

FIG. 5 is a flow chart illustrating an example image storage decoding process for a cloud network, arranged in accordance with at least some implementations of the present disclosure. In the illustrated implementation, process 500 may include one or more operations, functions or actions as illustrated by one or more of the blocks 501, 502, 504, 506, 508, 512, 514, 516, 518, 520, 524, 526, 528, 530, 532, 534, 536, 538, and/or 540. By way of non-limiting example, process 500 will be described herein with reference to example image storage system 100 of FIG. 1.

Process 500 may be utilized as a computer-implemented method for image storage. Process 500 may begin at block 501, "RETRIEVE IMAGE", where a request to retrieve an image may be received and/or initiated. Processing may continue from operation 501 to operation 502, "COARSE BASE IMAGE?", where a determination may be made regarding whether the retrieve image is associated with a stored coarse base image. Under some circumstances, processing may continue from operation 502 to operation 504, "C-DERIVED DIFFERENCE IMAGE?", where a determination may be made regarding whether the retrieve image is associated with a stored C-derived difference image. Under some circumstances, processing may continue from operation 504 to operation 506, "FINE BASE IMAGE?", where a determination may be made regarding whether the retrieve image is associated with a stored fine base image. Under some circumstances, processing may continue from operation 506 to operation 508, "F-DERIVED DIFFERENCE IMAGE", where a determination may be made regarding whether the retrieve image is associated with a stored F-derived difference image.

Under some circumstances, processing may continue from operation 502 to operation 512, "FETCH COARSE BASE IMAGE", where the coarse base image may be fetched from the database 412. Under some circumstances, processing may continue from operation 504 to operation 514, "FETCH COARSE BASE IMAGE AND C-DERIVED DIFFERENCE IMAGE", where the coarse base image and the C-derived difference image may be fetched. Under some circumstances, processing may continue from operation 506 to operation 516, "FETCH FINE BASE IMAGE", where the fine base image may be fetched. Under some circumstances, processing may continue from operation 508 to operation 518, "FETCH FINE BASE IMAGE AND F-DERIVED DIFFERENCE IMAGE", where the fine base image and F-derived difference image may be fetched.

Processing may continue from operation 512 to operation 520, "OUTPUT COARSE BASE IMAGE", where the coarse base image may be output.

Processing may continue from operation 514 to operation 524, "TREAT COARSE BASE IMAGE AS I-FRAME", where the coarse base image may be treated as an I-frame. Processing may continue from operation 524 to operation 526, "TREAT RETRIEVING IMAGE AS P-FRAME", where the retrieving image may be treated as a p-frame. Processing may continue from operation 526 to operation 528, "DECODE", where the retrieved i-frame and p-frame may be decoded. Processing may continue from operation 528 to operation 530, "OUTPUT DECODED IMAGE CONTENT", where decoded image content may be output.

Processing may continue from operation 516 to operation 532, "OUTPUT FINE BASE IMAGE", where a fine base image may be output.

Processing may continue from operation 518 to operation 534, "TREAT FINE BASE IMAGE AS I-FRAME", where the fine base image may be treated as an I-frame. Processing may continue from operation 534 to operation 536, "TREAT RETRIEVING IMAGE AS P-FRAME", where the retrieving image may be treated as a p-frame. Processing may continue from operation 536 to operation 538, "DECODE", where the retrieved i-frame and p-frame may be decoded. Processing may continue from operation 538 to operation 540, "OUTPUT DECODED IMAGE CONTENT", where decoded image content may be output.

In operation, process 500 may be utilized as a computer-implemented method for retrieving/downloading photos from a cloud storing system. If a retrieve image is a record of coarse base image or fine base image, it will be output to user directly. When a target photo is a record of a C-derived difference image or a F-derived difference image, the target photo may be decoded as a P-frame by a media decoder pipeline.

Figure 6:
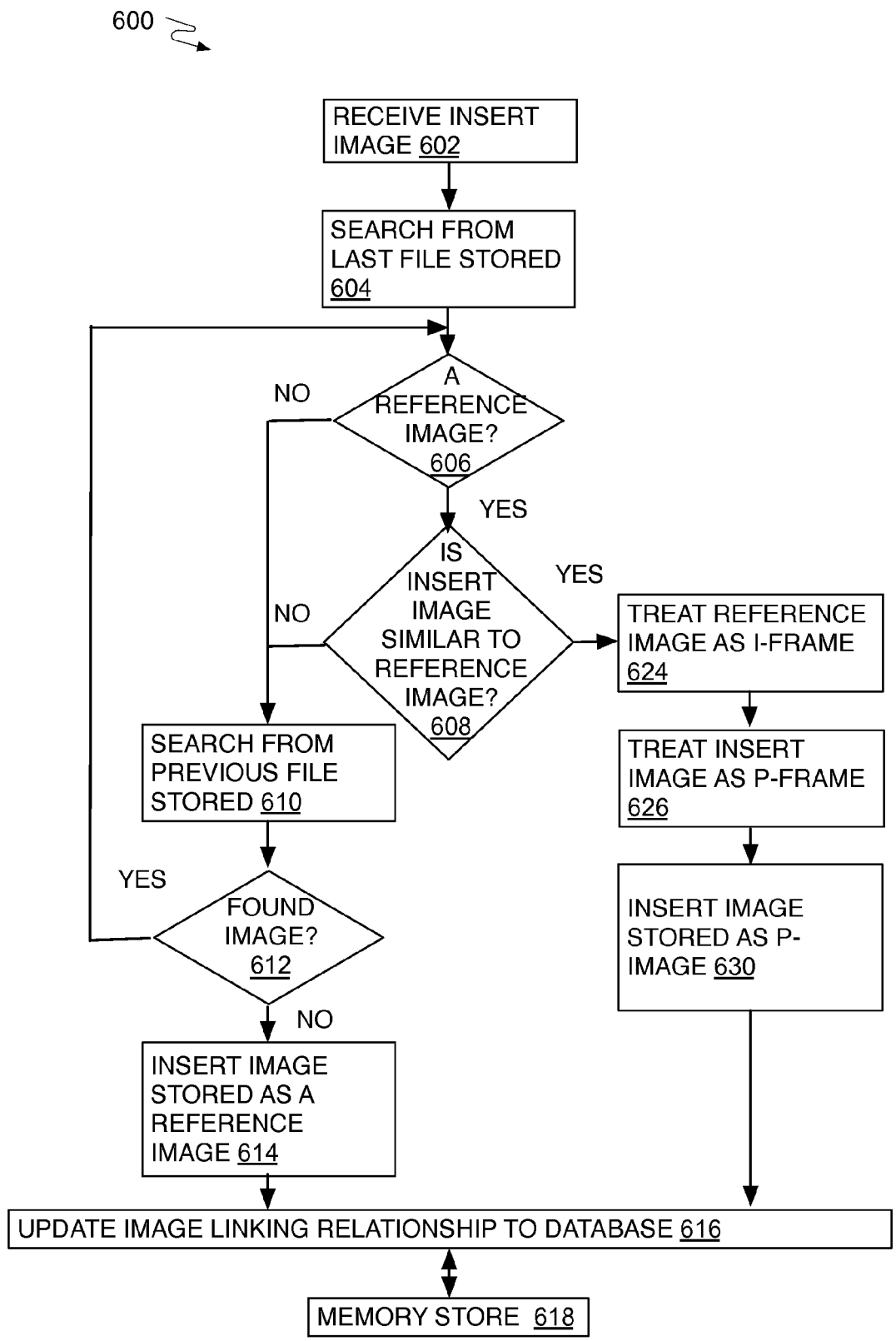
FIG. 6 is a flow chart illustrating an example image storage encoding process for a computing device.

FIG. 6 is a flow chart illustrating an example image storage encoding process for a computing device, arranged in accordance with at least some implementations of the present disclosure. In the illustrated implementation, process 600 may include one or more operations, functions or actions as illustrated by one or more of the blocks 602, 604, 606, 608, 610, 612, 614, 616, 618, 624, 626, 628, and/or 630. By way of non-limiting example, process 600 will be described herein with reference to example image storage system 100 of FIG. 1.

Process 600 may be utilized as a computer-implemented method for image storage. Process 600 may begin at block 602, "RECEIVE INSERT IMAGE", where an insert image may be received. For example, the insert image may be received by a computing device via capturing the insert image (such as via a charge coupled device and/or the like), where the computing device also may perform the encoding operations.

Processing may continue from operation 602 to operation 604, "SEARCH FROM LAST FILE STORED", where a search may be performed starting from the last file stored. Processing may continue from operation 604 to operation 606, "A REFERENCE IMAGE?", where a determination may be made regarding whether the insert image is a reference image. For example, stored reference images may be searched for a close match with the insert image. In some examples, such a search may include one or more algorithms, such as those commonly used in image identification or tag based classification, for example.

Under some circumstances, processing may continue from operation 606 to operation 608, "IS INSERT IMAGE SIMILAR TO REFERENCE IMAGE?", where a determination may be made regarding whether the insert image is similar to the reference image. For example, in cases where a close match with at least one reference image is found a determination may be made regarding whether a motion vector between the insert image and the close match reference image meets a threshold value.

Under some circumstances, processing may continue from operation 606 and/or 608 to operation 610, "SEARCH FROM PREVIOUS FILE STORED", where the search may be continued from a previous filed stored. For example, in cases where the motion vector between the insert image and the close match reference image does not meet the threshold value, a next stored reference image may be searched for a close match with the insert image.

Processing may continue from operation 610 to operation 612, "FOUND IMAGE?", where a determination may be made regarding whether a matching reference image has been found. Under some circumstances, processing may continue from operation 612 back to operation 606. Otherwise, under some circumstances, processing may continue from operation 612 to operation 614, "INSERT IMAGE STORED AS A REFERENCE IMAGE 614", where the insert image may be stored as a reference image. For example, in cases where a close match with at least one reference image is not found the insert image may be treated as a reference image, where the reference images may be stored without encoding.

Processing may continue from operation 614 to operation 616, "UPDATE IMAGE LINKING RELATIONSHIP TO DATABASE", where an image linking relationship from the insert image to the database (e.g., memory store 616) may be updated. For example, in cases where the insert image is stored as a reference image, the image content may be entirely stored. For example, in cases where the insert image is stored as a reference image, a reference flag may be inserted into the file header to indicate that the inserted image is a reference image.

Under some circumstances, processing may continue from operation 608 to operation 624, "TREAT REFERENCE IMAGE AS I-FRAME", where the reference image may be treated as an I-frame during encoding. Processing may continue from operation 624 to operation 626, "TREAT INSERT IMAGE AS P-FRAME", where the insert image may be treated as a P-frame during encoding. For example, in cases where the motion vector between the insert image and the close match reference image meets the threshold value, the close match reference image may be treated as an I-frame.

Processing may continue from operation 626 to operation 630, "INSERT IMAGE STORED AS P-IMAGE", where the insert image may be stored as a P-image. For example, the storing the P-frame encoded insert image along with associated linking relationship data may include storing a P-image, where the linking relationship data may be configured to associate a dependent relationship associated with the P-frame encoded insert image as compared to the reference image. Further, operation 616 may also be performed here. For example, in cases where the insert image is stored as a P-image, only necessary dependent relationships that indicate the small differences as compared to the stored reference image may be stored here. In some implementations, an index pointing to a reference image may be inserted into the image file header of the insert image.

In operation, process 600 may be utilized as a computer-implemented method for photo compression across files, treating each photo as one type of video frame as well as compressing photos in a way similar to that used in video encoding. Unlike in a video pipeline where all associated frames are packaged into a single file, here each photo may have its own file.

For example, take three similar photos. Originally the three similar photos may be stored separately. Each of the three similar photos may require a similar amount of storage, requiring storage in a consumer device for all three similar photos. Conversely, process 600 may be utilized to compress the three similar photos by a hardware encoder embedded in a consumer device. For example, only an original photo may be fully stored, while later photos may be stored only as differences as compared to the original photo. Thus, actual storage may be significantly reduced. Further, such compressed photos can also be easily accessed, by making use of a hardware decoder embedded in a consumer device to decompress and access such later photos.

In some examples, the image files may be stored in two types: 1) as a reference image, and 2) as a P-image. Both terms come from video codec pipeline. As used herein the term "reference image" may refer to an I-Frame-type image and while the term "P-image" may refer to a P-frame-type image. When a user shoots a new photo with a consumer device, if this image is not similar to any other image stored in the consumer device, the new photo may be completely stored as a full image called "reference image", otherwise the new photo may be stored as a "P-image" when the new photo is similar to some other stored image, which may only hold partial image information.

Figure 7:
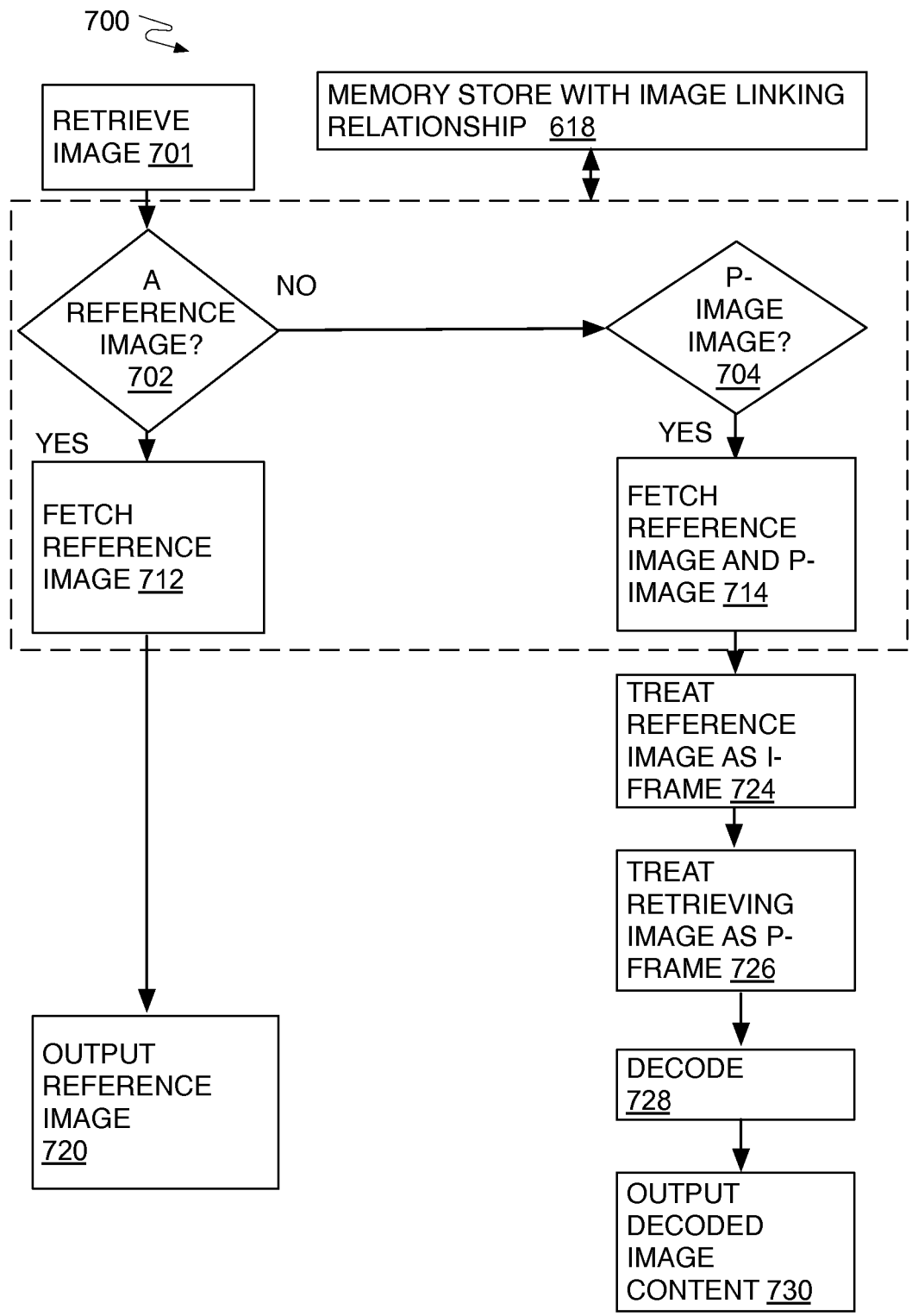
FIG. 7 is a flow chart illustrating an example image storage decoding process for a computing device.

FIG. 7 is a flow chart illustrating an example image storage decoding process for a computing device, arranged in accordance with at least some implementations of the present disclosure. In the illustrated implementation, process 700 may include one or more operations, functions or actions as illustrated by one or more of the blocks 701, 702, 704, 712, 714, 720, 722, 724, 726, 728, and/or 730. By way of non-limiting example, process 700 will be described herein with reference to example image storage system 100 of FIG. 1.

Process 700 may be utilized as a computer-implemented method for image storage. Process 700 may begin at block 701, "RETRIEVE IMAGE 701", where a request to retrieve an image may be received and/or initiated. Processing may continue from operation 701 to operation 702, "A REFERENCE IMAGE?", where a determination may be made regarding whether the requested image is a reference image. Under some circumstances, processing may continue from operation 702 to operation 704, "P-IMAGE IMAGE?", where a determination may be made regarding whether the requested image is a p-image.

Under some circumstances, processing may continue from operation 702 to operation 712, "FETCH REFERENCE IMAGE", where a reference image may be fetched from memory store 616. Under some circumstances, processing may continue from operation 704 to operation 714, "FETCH REFERENCE IMAGE AND P-IMAGE", where a reference image as well as a p-image may be fetched.

Processing may continue from operation 712 to operation 720, "OUTPUT REFERENCE IMAGE", where the fetched reference image may be output.

Processing may continue from operation 714 to operation 724, "TREAT REFERENCE IMAGE AS I-FRAME", where the fetched reference image may be treated as an i-frame during decoding. Processing may continue from operation 724 to operation 726, "TREAT RETRIEVING IMAGE AS P-FRAME", where the fetched p-image may be treated as a p-frame during decoding. Processing may continue from operation 726 to operation 728, "DECODE", where the fetched p-image and reference image may be decoded. Processing may continue from operation 728 to operation 730, "OUTPUT DECODED IMAGE CONTENT", where the decoded image may be output.

In operation, process 700 may be utilized as a computer-implemented method for retrieving an image whenever a user needs to view or export this image. As illustrated, process 700 is quite straightforward by sending a necessary reference image and P-image information to a hardware decoder embedded in the consumer device to retrieve an image.

While implementation of example processes 300, 400, 500, 600, and 700, as illustrated in FIGS. 3, 4, 5, 6, and 7, may include the undertaking of all blocks shown in the order illustrated, the present disclosure is not limited in this regard and, in various examples, implementation of processes 300, 400, 500, 600, and 700 may include the undertaking only a subset of the blocks shown and/or in a different order than illustrated.

In addition, any one or more of the blocks of FIGS. 3, 4, 5, 6, and 7 may be undertaken in response to instructions provided by one or more computer-program products. Such program products may include signal bearing media providing instructions that, when executed by, for example, a processor, may provide the functionality described herein. The computer-program products may be provided in any form of computer-readable medium. Thus, for example, a processor including one or more processor core(s) may undertake one or more of the blocks shown in FIGS. 3, 4, 5, 6, and 7 in response to instructions conveyed to the processor by a computer-readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
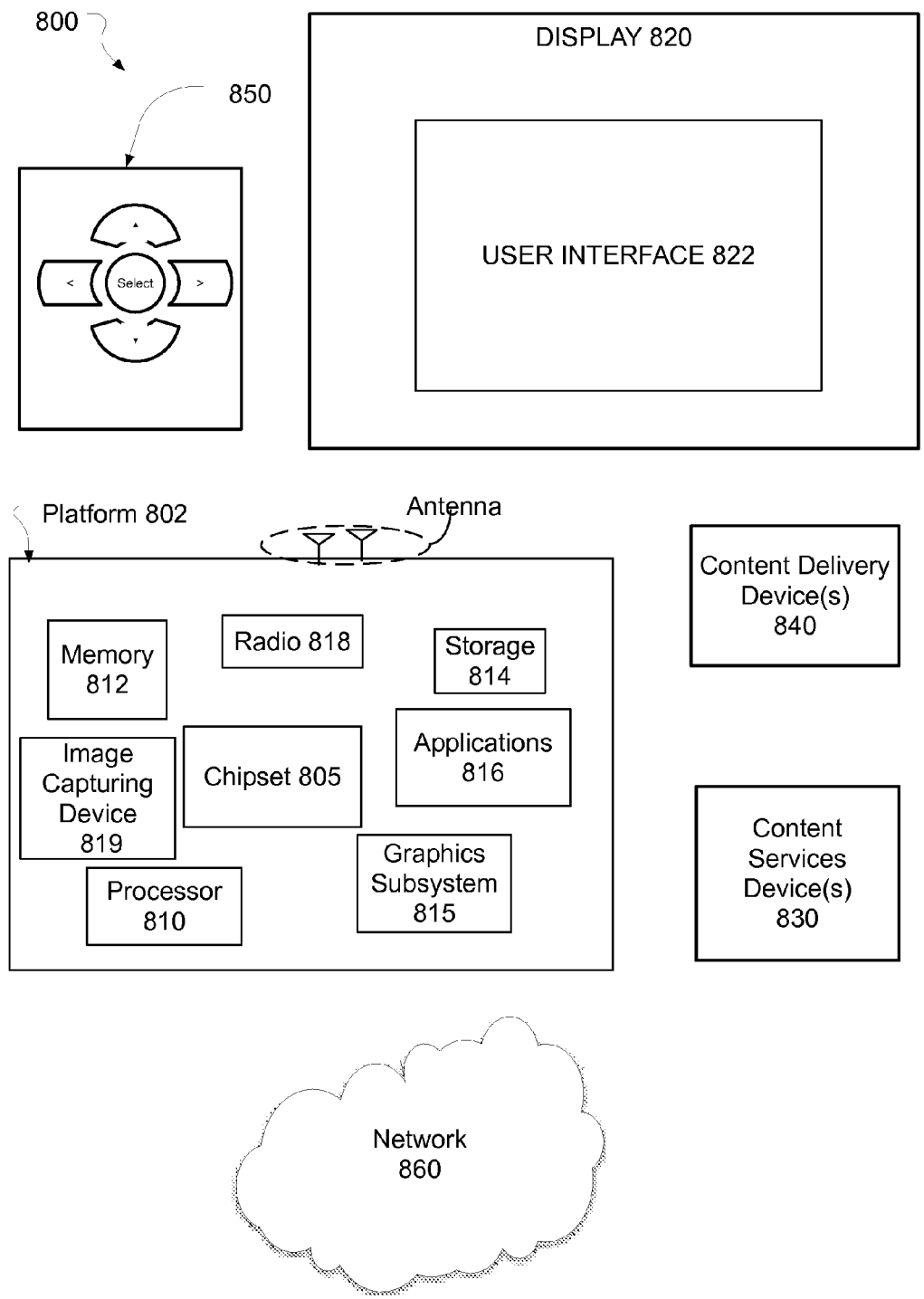
FIG. 8 is an illustrative diagram of an example system.

FIG. 8 illustrates an example system 800 in accordance with the present disclosure. In various implementations, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, storage 814, graphics subsystem 815, applications 816 and/or radio 818, and/or image capturing device 819. Chipset 805 may provide intercommunication among processor 810, memory 812, storage 814, graphics subsystem 815, applications 816 and/or radio 818, and/or image capturing device 819. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, Display Port, wireless HDMI, and/or wireless HD compliant techniques. Graphics subsystem 815 may be integrated into processor 810 or chipset 805. In some implementations, graphics subsystem 815 may be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

Image capturing device 819 may include one or more devices capable of capturing images, such as still images or video, for example. Example image capturing devices 819 may include (but are not limited to) Charge-Coupled Devices (CCD), Complimentary Metal-Oxide Semiconductor (CMOS) image sensors, the like, and/or combinations thereof.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for (8.1) surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
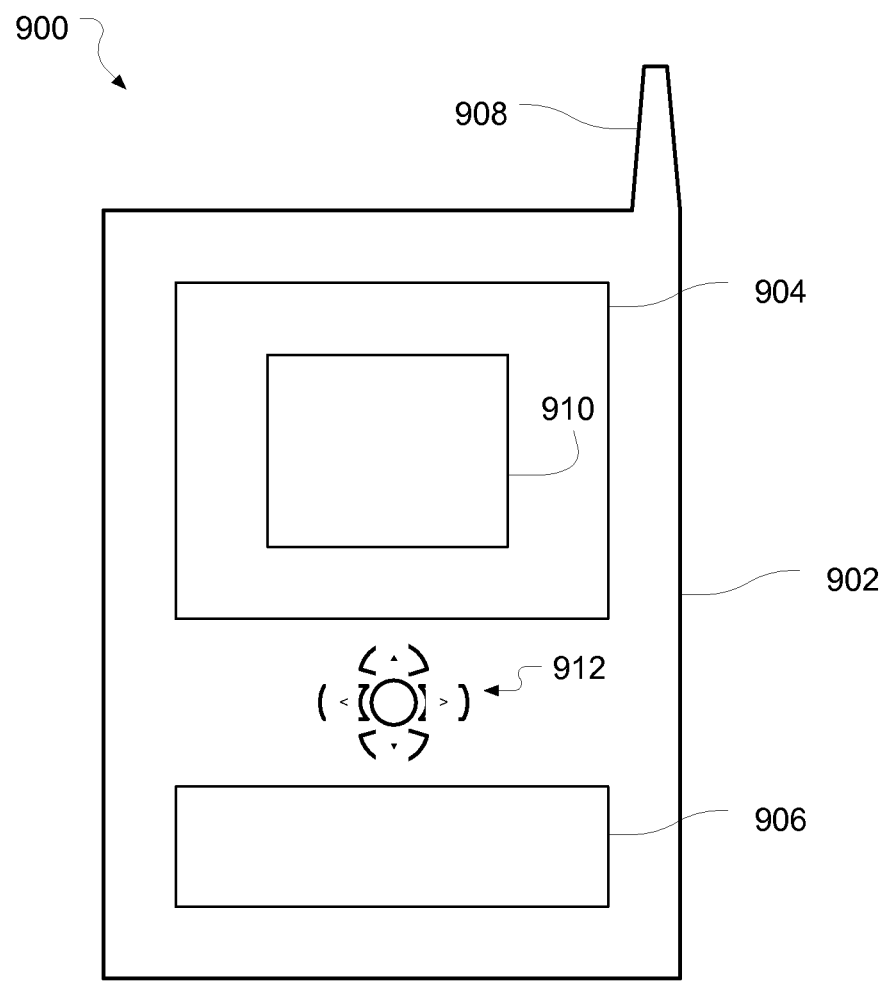
FIG. 9 is an illustrative diagram of an example system; all arranged in accordance with at least some implementations of the present disclosure.

As described above, system 800 may be embodied in varying physical styles or form factors. FIG. 9 illustrates implementations of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing 902, a display 904, an input/output (I/O) device 906, and an antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for coder-based partial-image storage and retrieval, the method comprising:
   receiving an insert image;
   searching stored reference images for a close match with the insert image;
   in cases in which a close match with at least one reference image is found:
      treating the insert image as a P-frame during encoding; and
      storing the P-frame encoded insert image along with associated linking relationship data, the linking relationship data being configured to associate a dependent relationship associated with the P-frame encoded insert image; and
   in cases in which a close match with at least one reference image is not found:
      treating the insert image as a reference image; and
      storing the insert image as a coarse base image.

2. The method of claim 1, wherein the insert image is received by being uploaded to a cloud network.

3. The method of claim 1, further comprising:
   in cases in which a close match with at least one reference image is found:
      treating the close match reference image as an I-frame; and
      determining whether a motion vector between the insert image and the close match reference image meets a threshold value; and
   wherein in cases in which the motion vector between the insert image and the close match reference image meets the threshold value:
      the storing of the P-frame encoded insert image along with associated linking relationship data further comprises storing a C-derived difference image, and the linking relationship data is configured to associate a dependent relationship associated with the P-frame encoded insert image as compared to the coarse base image.

4. The method of claim 1, further comprising:
   in cases in which a close match with at least one reference image is found:
      treating the close match reference image as an I-frame; and
      determining whether a motion vector between the insert image and the close match reference image meets a threshold value;
   in cases in which the motion vector between the insert image and the close match reference image does not meet the threshold value:
      searching a first stored fine base image-type reference images for a close match with the insert image; and
   in cases in which a close match with at least one fine base image-type reference image is not found:
      treating the insert image as a fine base image-type reference image, and storing the fine base image-type reference images as the fine base image-type.

5. The method of claim 1, further comprising:
   in cases in which a close match with at least one reference image is found:
      treating the close match reference image as an I-frame; and
      determining whether a motion vector between the insert image and the close match reference image meets a threshold value;
   in cases in which the motion vector between the insert image and the close match reference image does not meet the threshold value:
      searching a first stored fine base image-type reference images for a close match with the insert image;
   in cases in which a close match with at least one fine base image-type reference image is found:
      treating the close match fine base image-type reference image as an I-frame; and
      determining whether a motion vector between the insert image and the close match fine base image-type reference image meets a threshold value;
   wherein in cases in which the motion vector between the insert image and the close match fine base image-type reference image meets the threshold value:
      the storing of the P-frame encoded insert image along with associated linking relationship data further comprises storing a F-derived difference image, and the linking relationship data is configured to associate a dependent relationship associated with the P-frame encoded insert image as compared to the fine base image-type reference image; and
   in cases in which the motion vector between the insert image and the close match fine base image-type reference image does not meet the threshold value:

searching the next stored fine base image-type reference image for a close match with the insert image.

6. The method of claim 1, wherein the insert image is received by a computing device via capturing the insert image, and wherein the computing device also performs the encoding operations.

7. The method of claim 1, further comprising:
in cases in which a close match with at least one reference image is not found:
treating the insert image as a reference image, and storing the reference images without encoding.

8. The method of claim 1, wherein further comprising:
in cases in which a close match with at least one reference image is found:
determining whether a motion vector between the insert image and the close match reference image meets a threshold value;
in cases in which the motion vector between the insert image and the close match reference image meets the threshold value:
treating the close match reference image as an I-frame, and
the storing of the P-frame encoded insert image along with associated linking relationship data further comprises storing a P-image, and the linking relationship data is configured to associate a dependent relationship associated with the P-frame encoded insert image as compared to the reference image.

9. The method of claim 1, further comprising:
in cases in which a close match with at least one reference image is found:
determining whether a motion vector between the insert image and the close match reference image meets a threshold value; and
in cases in which the motion vector between the insert image and the close match reference image does not meet the threshold value:
searching a next stored reference image for a close match with the insert image.

10. The method of claim 1, further comprising:
in cases in which a close match with at least one reference image is found:
treating the close match reference image as an I-frame; and
determining whether a motion vector between the insert image and the close match reference image meets a threshold value;
wherein in cases in which the motion vector between the insert image and the close match reference image meets the threshold value:
the storing of the P-frame encoded insert image along with associated linking relationship data further comprises storing a C-derived difference image, and the linking relationship data is configured to associate a dependent relationship associated with the P-frame encoded insert image as compared to the coarse base image;
in cases in which the motion vector between the insert image and the close match reference image does not meet the threshold value:
searching a first stored fine base image-type reference images for a close match with the insert image;
in cases in which a close match with at least one fine base image-type reference image is not found:
treating the insert image as a fine base image-type reference image, and storing the fine base image-type reference images as the fine base image-type;
in cases in which a close match with at least one fine base image-type reference image is found:
treating the close match fine base image-type reference image as an I-frame; and
determining whether a motion vector between the insert image and the close match fine base image-type reference image meets a threshold value;
wherein in cases in which the motion vector between the insert image and the close match fine base image-type reference image meets the threshold value:
the storing of the P-frame encoded insert image along with associated linking relationship data further comprises storing a F-derived difference image, and the linking relationship data is configured to associate a dependent relationship associated with the P-frame encoded insert image as compared to the fine base image-type reference image; and
in cases in which the motion vector between the insert image and the close match fine base image-type reference image does not meet the threshold value:
searching the next stored fine base image-type reference image for a close match with the insert image,
wherein the insert image is received by being uploaded to a cloud network.

11. The method of claim 1, further comprising:
in cases in which a close match with at least one reference image is not found:
treating the insert image as a reference image, and storing the reference images without encoding;
in cases in which a close match with at least one reference image is found:
determining whether a motion vector between the insert image and the close match reference image meets a threshold value;
in cases in which the motion vector between the insert image and the close match reference image meets the threshold value:
treating the close match reference image as an I-frame; and
wherein the storing of the P-frame encoded insert image along with associated linking relationship data further comprises storing a P-image, and the linking relationship data is configured to associate a dependent relationship associated with the P-frame encoded insert image as compared to the reference image; and
in cases in which the motion vector between the insert image and the close match reference image does not meet the threshold value:
searching a next stored reference image for a close match with the insert image,
wherein the insert image is received by a computing device via capturing the insert image, and wherein the computing device also performs the encoding operations.

12. A system for coder-based partial-image storage and retrieval on a cloud network, the system comprising:
one or more servers configured to support the cloud network;
one or more encoders communicatively coupled to the one or more servers;
one or more memory stores communicatively coupled to the one or more encoders;

a search module implemented by the one or more servers and configured to, in conjunction with the one or more encoders and the one or more memory stores:
receive an insert image;
search stored reference images for a close match with the insert image;
treat the insert image as a P-frame during encoding if a close match with at least one reference image; and
store the P-frame encoded insert image along with associated linking relationship data, and the linking relationship data is configured to associate a dependent relationship associated with the P-frame encoded insert image, and
in cases in which a close match with at least one reference image is not found, the search module, in conjunction with the one or more encoders and the one or more memory stores, is further configured to:
treat the insert image as a reference image, and store the reference images being a coarse base image.

13. The system of claim 12, wherein,
in cases in which a close match with at least one reference image is found, the search module, in conjunction with the one or more encoders and the one or more memory stores, is further configured to:
treat the close match reference image as an I-frame;
determine whether a motion vector between the insert image and the close match reference image meets a threshold value; and
in cases in which the motion vector between the insert image and the close match reference image meets the threshold value, the search module, in conjunction with the one or more encoders and the one or more memory stores, is further configured to:
store the P-frame encoded insert image along with associated linking relationship data as a C-derived difference image, and the linking relationship data is configured to associate a dependent relationship associated with the P-frame encoded insert image as compared to the coarse base image.

14. The system of claim 12, wherein,
in cases in which a close match with at least one reference image is found, the search module, in conjunction with the one or more encoders and the one or more memory stores, is further configured to:
treat the close match reference image as an I-frame;
determine whether a motion vector between the insert image and the close match reference image meets a threshold value;
in cases in which the motion vector between the insert image and the close match reference image meets the threshold value, the search module, in conjunction with the one or more encoders and the one or more memory stores, is further configured to:
store the P-frame encoded insert image along with associated linking relationship data as a C-derived difference image, and the linking relationship data is configured to associate a dependent relationship associated with the P-frame encoded insert image as compared to the coarse base image;
in cases in which the motion vector between the insert image and the close match reference image does not meet the threshold value, the search module, in conjunction with the one or more encoders and the one or more memory stores, is further configured to:
search a first stored fine base image-type reference images for a close match with the insert image;

in cases in which a close match with at least one fine base image-type reference image is not found, the search module, in conjunction with the one or more encoders and the one or more memory stores, is further configured to:
treat the insert image as a fine base image-type reference image, and the fine base image-type reference images are stored as the fine base image-type;
in cases in which a close match with at least one fine base image-type reference image is found, the search module, in conjunction with the one or more encoders and the one or more memory stores, is further configured to:
treat the close match fine base image-type reference image as an I-frame; and
determine whether a motion vector between the insert image and the close match fine base image-type reference image meets a threshold value;
in cases in which the motion vector between the insert image and the close match fine base image-type reference image meets the threshold value, the search module, in conjunction with the one or more encoders and the one or more memory stores, is further configured to:
store the P-frame encoded insert image along with associated linking relationship data as a F-derived difference image, and the linking relationship data is configured to associate a dependent relationship associated with the P-frame encoded insert image as compared to the fine base image-type reference image; and
in cases in which the motion vector between the insert image and the close match fine base image-type reference image does not meet the threshold value, the search module, in conjunction with the one or more encoders and the one or more memory stores, is further configured to:
search the next stored fine base image-type reference image for a close match with the insert image,
wherein the insert image is received by being uploaded to a cloud network.

15. An apparatus for coder-based partial-image storage and retrieval on a computing device, the apparatus comprising:
one or more processors;
one or more encoders communicatively coupled to the one or more processors;
one or more memory stores communicatively coupled to the one or more encoders;
an image capturing component configured to capture still images;
a search module implemented by the one or more processors and configured to, in conjunction with the one or more encoders and the one or more memory stores:
receive an insert image from image capturing component, the insert image being one of the captured still images;
search stored reference images for a close match with the insert image;
treat the insert image as a P-frame during encoding if a close match if found with at least one reference image; and
store the P-frame encoded insert image along with associated linking relationship data, and the linking relationship data is configured to associate a dependent relationship associated with the P-frame encoded insert image, and
in cases in which a close match with at least one reference image is not found, the search module, in conjunction with the one or more encoders and the one or more memory stores, being further configured to:
  treat the insert image as a reference image, and store the reference images without encoding.

16. The apparatus of claim 15, wherein,
in cases in which a close match with at least one reference image is found, the search module, in conjunction with the one or more encoders and the one or more memory stores, is further configured to:
  determine whether a motion vector between the insert image and the close match reference image meets a threshold value;
in cases in which the motion vector between the insert image and the close match reference image meets the threshold value, the search module, in conjunction with the one or more encoders and the one or more memory stores, is further configured to:
  treat the close match reference image as an I-frame, and store the P-frame encoded insert image along with associated linking relationship data as a P-image, and the linking relationship data is configured to associate a dependent relationship associated with the P-frame encoded insert image as compared to the reference image.

17. The apparatus of claim 15, wherein,
in cases in which a close match with at least one reference image is found, the search module, in conjunction with the one or more encoders and the one or more memory stores, is further configured to:
  determine whether a motion vector between the insert image and the close match reference image meets a threshold value;
in cases in which the motion vector between the insert image and the close match reference image meets the threshold value, the search module, in conjunction with the one or more encoders and the one or more memory stores, is further configured to:
  treat the close match reference image as an I-frame; and
  store the P-frame encoded insert image along with associated linking relationship data as a P-image, and the linking relationship data is configured to associate a dependent relationship associated with the P-frame encoded insert image as compared to the reference image; and
in cases in which the motion vector between the insert image and the close match reference image does not meet the threshold value, the search module, in conjunction with the one or more encoders and the one or more memory stores, is further configured to:
  search a next stored reference image for a close match with the insert image, and the insert image is received by a computing device via capturing the insert image, and the computing device also performs the encoding operations.

* * * * *